United States Patent [19]
Phillips et al.

[11] 3,864,939
[45] Feb. 11, 1975

[54] DOUBLET HAVING FIBER OPTICAL ELEMENT FOR CHATOYANT OR ASTERISMAL DISPLAY

[75] Inventors: Michael R. Phillips; Jerome H. Ludwig, both of Cleveland, Ohio

[73] Assignee: Queensbury Opal Co. Ltd., Cleveland, Ohio

[22] Filed: Apr. 24, 1973

[21] Appl. No.: 354,100

Related U.S. Application Data

[62] Division of Ser. No. 261,022, June 8, 1972, Pat. No. 3,742,731.

[52] U.S. Cl. ............................. 63/32, 106/42, 161/1
[51] Int. Cl. ................................................ A44c 17/00
[58] Field of Search ............. 63/32; 106/42; 40/141, 40/135; 161/1

[56] References Cited
UNITED STATES PATENTS

| | | | |
|---|---|---|---|
| 1,351,562 | 8/1920 | Foster | 63/32 UX |
| 2,535,807 | 12/1950 | Moyd | 63/32 |
| 2,825,260 | 3/1958 | O'Brien | 350/96 |
| 2,948,082 | 8/1960 | Watson | 63/32 X |
| 2,992,587 | 7/1961 | Hicks et al. | 350/96 |
| 3,589,793 | 6/1971 | Curtiss | 350/6 |
| 3,625,669 | 12/1971 | Norton | 65/4 |
| 3,626,040 | 12/1971 | Kazwyoshi et al. | 264/1 |

*Primary Examiner*—F. Barry Shay
*Attorney, Agent, or Firm*—Wood, Herron & Evans

[57] ABSTRACT

A method of manufacturing gems including artificial gemstones or other works of art displaying the optical effect of single or multi-lined chatoyancy, even asterism, from fiber optical materials. Simulated gemstones of glass fiber optical materials are characterized by hardness, density and refractive index approximating naturally occurring rare minerals, yet the gemstones display beauty and optical effects rarely seen in the natural minerals. Doublet gemstones are also made by mounting natural or synthetic gemstones or light-transmitting materials, normally devoid of chatoyancy or asterism, onto a properly fashioned and oriented fiber optical base plate so that single or multi-lined chatoyancy is fascinatingly observed in such materials as if the materials themselves were chatoyant or asterismal. Gemstones of emerald, ruby, opal, topaz, peridot, amethyst and other transparent or semi-transparent cabochoned gems are provided with chatoyancy or multi-lined chatoyancy, even asterism. Also, natural mineral gemstones which exhibit poor chatoyancy or asterism are provided with enhanced optical effects by mounting onto a properly fashioned and oriented fiber optical base plate. Enhanced chatoyant or asterismal gemstones of chrysoberyl, sapphire, tourmaline and the like are made according to the method disclosed.

6 Claims, 11 Drawing Figures

PATENTED FEB 1 1 1975  3,864,939

DOUBLET HAVING FIBER OPTICAL ELEMENT FOR CHATOYANT OR ASTERISMAL DISPLAY

This is a division of application Ser. No. 261,022 dated June 8, 1972 now U.S. Pat. No. 3,742,731.

BACKGROUND OF THE INVENTION

Naturally occurring mineral stones, i.e., gemstones, which exhibit a fine, brilliant-lined chatoyant or asterismal optical effect are comparatively rate and hence they are highly prized. Such gemstones must be oriented and precisely cut or shaped to rounded or convex form by one well experienced in this art, and in such form provide an enhanced star-like or cat's-eye optical effect when viewed under suitable lighting conditions. If a slight error is made in cutting and shaping the stone, the chatoyant or asterismal effect can be diminished or even lost. This asterismal or chatoyant effect seems to be due to reflection of light from regular arrangements or orientations of minute inclusions or to lattice-like crystalline structures present within the interior of the gemstone itself. "Cat's-eye" is the name applied to gemstones on the surface of which shifting bands of light seem to move when the stones are turned. Thus, this optical effect is called "chatoyancy" and it is best observed in polished, rounded stones shaped like coffee beans. Most commonly, however, the stones are shaped and polished into a somewhat hemispherical form, called a "cabochon" by lapidaries. Cat's-eye is frequently considered the synonym for the mineral chrysoberyl, but other minerals such as quartz, tourmaline, scapolite, etc., may display chatoyancy. A fine rare, honey-colored chrysoberyl cat's-eye of average size commands a price comparable with the finest diamond or flawless emerald of similar size and weight. Moreover, sapphires, rubies, garnets and other gemstones which are capable of exhibiting a star-shaped optical effect or chatoyancy are also rare and therefore highly prized.

In view of the rather rare natural existence of chatoyant or asterismal gemstones, many efforts have been directed by others heretofore to artificially produce or imitate such stones. Such efforts of the prior art may be represented by a number of patents including U.S. Pat. Nos. 2,081,483; 2,090,240; 2,488,507; 2,511,510; 2,535,807; 2,948,082 and 3,581,522. In general, such prior art can be summarized into various main techniques including mechanically etching or forming grooves in the flat base portion of a cabochon-shaped gem which cause by reflection of light a chatoyant or asterismal effect to be displayed on the curved surface of the cabochon. Also, capillary voids or air bubbles have been formed in quartz gem matrixes to provide a chatoyant effect. A so-called "doublet" construction has been proposed whereby a grooved plate is secured to the flat side of a cabochon gem to produce the desired optical effects in the otherwise non-chatoyant or non-asterismal gem. The introduction of impurities, flakes, crystals, or fibrils, etc. into plastic or mineral matrixes has also been proposed. Representative disclosures of these various techniques include U.S. Pat. Nos. 2,081,483; 2,090,240; 2,948,082 and 3,581,522. Collectively, the artificial gems heretofore produced have gained a certain amount of appeal; however, efforts are still being made to more ideally capture via synthesis the beauty of asterism or chatoyancy in a gem. Mechanical grooves, etchings, impurities, fibrils or air capillaries and the like which have been used as the means to provide a gem matrix with chatoyancy or asterism have not completely satisfied the desire to simulate these optical effects with flawlessness or greater degree of light display purity. Quite commonly, presently available simulated gemstones upon observance readily appear to be imitations. Also, collectively materials for the production of simulated gemstones tend to suffer from one or more deficiencies including softness, low density, degradation upon aging and exposure to light, susceptibility to wear and scratching, etc., aside from their lack of desired perfection in the display of chatoyant and asterismal effects. Even the natural minerals can only be made into gemstones with difficulty as mentioned above with the risk of ruining the mineral workpiece. Such deficiencies have contributed to the lack of prized acceptance of imitation gems, and the beauty of chatoyancy or asterism that exists in the rare gems cannot be commonly enjoyed. Therefore, even in view of the long development history in the imitation and natural gemstones art, there is the need for further improvements.

SUMMARY OF THE INVENTION

This invention is directed to gems or works of art and to methods for manufacturing gems that display the optical effect of single or multi-lined chatoyancy or asterism. Both imitation and natural mineral materials are provided with fascinating beauty and perfection in exhibiting chatoyancy or asterism according to our invention. In one embodiment, our gems comprise entirely a fiber optical material which has been formed, oriented, cut and shaped into cabochons, rings, vases or other works of art to exhibit chatoyancy or asterism. In another embodiment, this invention provides for a doublet construction and method in which a natural or synthetic light-transmitting material may be shaped and cut and, whereas such a material alone normally would not exhibit chatoyancy or asterism, when a properly fashioned and oriented fiber optical element is mounted on the cut shapes, the beauty of chatoyancy or asterism is displayed in such materials. Enhancement of naturally chatoyant or asterismal gem materials can also be achieved by the method and products of this invention.

In a preferred form, a gem according to the principles of this invention comprises a solid fused bundle of a multitude of light-conducting glass fibers which are very fine, i.e., have micron-sized thicknesses, and elongated and which have cores of high refractive index glass clad within a surrounding layer of lower refractive index glass. The fibers are arranged in adjacent parallel side-by-side relation to each other. It has been found that glass fiber optical materials are especially useful as starting materials in making gems according to this invention. We have adapted fiber optical materials and employed the phenomenon of so-called "light piping" advantageously by essentially orienting, cutting or assembling such materials and shaping gemstones therefrom which exhibit heretofore unachieved and consistent perfection in optical chatoyancy, multi-lined chatoyancy or asterism. The density and hardness of our glass fiber optical gems having glass-clad or glass-core fibers in fused solid form have been found to closely approximate the prized natural minerals, such as chrysoberyl. Therefore, there is substantially no difference in weight between an artificial gemstone of our invention and a natural chrysoberyl gemstone cut to similar size. Also, our artificial gemstones are scratch and wear resistant which makes them especially suitable for use in jewelry, and they may be re-polished or re-cut without loss of the desired optical effects in contrast to the risks associated with re-cutting the natural minerals as mentioned above. Even the rare honey-colored or greenish-yellow or other preferred colors of the rare natural gemstones can be matched with proper pigmentation of the glass fiber optical elements. Inorganic coloring agents or colorants, as desired, can be dissolved or dispersed in the glass compositions to provide gem color. Such colorants are disclosed in "Properties of Glass" by George W. Morey, Second Edition, American Chemical Society Monograph Series, Reinhold Publishing Corporation, New York, 1960 at pp. 454–64. Furthermore, by selecting glass compositions, refractive indexes and cross-sectional dimensions of the fiber cores, the fused fibers can be made to transmit wavelengths of light corresponding to the desired visible color. For example, a greenish-yellow color can be achieved with a lanthanum borate glass having a core refractive index of about 1.87 and a clad refractive index of about 1.48 with a core fiber size of 5.7 microns (Example 2, hereinafter).

In comparison to the heretofore imitation gemstones of which we are aware, the uniformity of beauty and perfection exhibited by our artificial gemstones is unmatched. Furthermore, other gems or works of art can be made according to the principles of our invention, such as rings, vases, figures and the like having chatoyant or multi-chatoyant optical displays. Naturally occurring chatoyant minerals are rarely found in the single crystal size to allow carvings such as rings, vases, figures and the like to be created from them and the cost of such would be prohibitive. By employing the teachings of this invention, works of art never before possible can be created.

In another form of this invention, we have discovered that, quite unexpectedly, a plate of properly fashioned fiber optical material can be secured to a natural mineral or synthetic gemstone material normally devoid of asterism or chatoyancy effect and thereby render such material capable of exhibiting either effect. For this purpose, a doublet gemstone construction is provided by this invention which comprises a natural mineral or synthetic material of light-transmitting character having a normally exposed optical display surface, usually rounded or convex of a cabochon type, and having a flat base portion. Secured by gluing or bonding to the flat base portion of the hemispherical or cabochon shape is a plate of relatively flat construction comprised of a fiber optical element having a solid fused bundle of a multitude of light-conducting fibers. These fused fibers, as in the case of our first mentioned embodiment, have cores of high refractive index material clad within a surrounding layer of lower refractive index material and they are disposed in adjacent parallel side-by-side relation to each other and parallel to the base of the upper mounted cabochon. Glass-clad on glass-core fibers in fused bundle form have been successfully adapted for use in the base plates. The optical display in this doublet-cabochon construction is not completely understood, however, gems of this doublet construction have been prepared using cabochon-shaped natural rubies, amethysts, opals and the like with a fiber optical flat base plate secured to the cabochon base and a beautiful chatoyancy or asterism is observed. Also, in the case of naturally chatoyant minerals, such as tourmalines, chrysoberyl, etc., such chatoyancy can be exceedingly enhanced by our doublet construction.

The simulated gemstones comprising the fiber optical materials may be cut and shaped in many forms unlike the natural gemstones, but the most desirable shape where the chatoyant or asterism phenomenon is enhanced is a rounded or convex shape, especially a "cabochon." As mentioned above, this is a familiar shape to jewelers who cut precious or semiprecious stones to enhance their appearance. However, the shape may be oval, rectangular, or any other desired shape. In the preferred cabochon shape, the fibers of the optical elements are preferably parallel to the cabochon base to provide the optical effect of chatoyancy. Fiber optical materials and methods of their preparation which have been found suitable for use in the preparation of our artificial gems are described in U.S. Pat. Nos. 2,825,260; 2,992,587; 3,589,793; 3,625,669 and 3,626,040.

This invention in one of its broadest aspects is thus predicated in part upon the discovery that a fused bundle of fine, elongated fibers having a high refractive index core and a lower refractive index clad coating or surrounding medium can be adapted to pipe or guide light through the fiber cores from one end of the fibers on a light-exposed (light-receiving) surface area of a gem body to the opposite ends of those fibers situated on a second or opposite surface area of a gem such that the light is seen on the second (light-displaying) surface area of the gem as it is emitted. Such light-piping fibers that extend their full length through a gem body from one surface to another is a unique concept. In particular, fused fiber bundles which have a high refractive index glass core and a lower refractive index clad coating or surrounding medium, when cut and shaped according to our invention, provide especially advantageous results. The glass fiber core has a cross-sectional dimension of about 5–80 microns and cladding or fused matrix of a lower refractive index glass or plastic surrounding the core fibers is of sufficient magnitude to prevent loss of core transmitted light, depending upon a number of factors known in fiber optics, to provide light-piping. While, therefore, the magnitude or thickness of the clad layer will vary, usually about 20 percent of the cross-sectional area of the core is satisfactory. An example of a glass fiber optical material would have a core of clear optical flint glass having a high optical index of 1.60 to 1.8 with a borosilicate glass coating of lower index such as 1.51 or less. Thus, the coating acts as a light barrier to prevent the loss of light transmitted through the core. Since the chatoyant and asterismal solid gems of this invention depend upon the piping of light through fiber optical materials, the precise dimensions of the core diameter and the coating or separation matrix between the cores may vary as it can be appreciated. The piping of light or the total reflection through a glass core, while requiring separation between the elongated parallel core fibers, in order to get the desired effects, will depend not only on the diameter of the glass core, but the refractive indexes of the core and the coating, and on the angular spread of the incoming light through the gem body. As the diameter of the fiber decreases, however, to less than 5 microns down to less than about 2 microns, the possible number of angles for incoming light decreases and the display of light sought is not as desirably discernible under a broad spectrum of light wavelengths and modes. Also, at diameters closely approximating the wavelength of light or less, more and more energy travels outside the fiber core and is absorbed in the surrounding matrix and light-piping is diminished.

As a general guide, fiber core diameters should be on the order of at least 3-5 microns and generally within a range of about 5-80 with the upper limit defined by the desirability to avoid the visual appearance of the fiber cores on the surface of the cut and polished gems or works of art. Gems prepared with core fiber diameters of about 5-15 microns and clad layers of about 20 percent of core cross-sectional thickness areas are especially satisfactory. However, with reference to the above glass fiber optical patents and the field of glass fiber optics, it will become apparent that the glass fiber optical materials of which our artificial gems are preferably made can be varied with the proviso that the higher refractive index of the core glass be clad with a lower index of refraction material to provide the light-piping effect. While many different optical glass combinations can be achieved to provide the differential index of refraction between the core and the clad glass materials of the gem matrix, reference is made to the text entitled "Properties of Glass" by George W. Morey, Second Edition, American Chemical Society Monograph Series, Rinehold Publishing Corporation, (New York), 1960, particularly Chapter XVI, for a selection of many different types of glasses with varying refractive indices to select the suitable pairs of high and low index glasses for practicing this invention. Some typical glass fiber optic materials and corresponding numerical apertures (NA) include (1) a core index of 1.52 and a coating index of 1.48 having a numerical aperture of 0.35, (2) a core index of 1.62 and a coating index of 1.52 having a numerical aperture of 0.56, (3) a core index of 1.66 and a coating index of 1.52 having a numerical aperture of 0.67 and (4) a core index of 1.81 and a coating index of 1.48 having a numerical aperture of 1.04. Another example of such a glass-clad glass-core fiber element is a borosilicate glass coating provided around flint glass core of fibers as suggested in American Optical Company U.S. Pat. No. 2,992,587. However, optical glass makers have provided many glass-clad glass-core fibers which are suitable and by a selection of pairs of glasses, the essential higher refractive index glass core composition may be clad with a low refractive index coating or matrix composition prior to fusing in bundle form as mentioned in the foregoing patents pertaining to fused bundles of glass fiber optical materials. Similarly, reference is made to the mentioned patents and to the brochure enitled "Fiber Optics; Principles, Properties and Design Consideration" by Dr. Walter P. Siegmund, American Optical Corporation, Nov. 1970, for a discussion of the history of fiber optics, its principles, formulas for lense optics and numerical apertures of light-guide fibers, suitable fiber materials, etc., and such will advise a person of ordinary skill with the necessary information concenring glass and its properties. Also, reference is made to the 1966 book of ASTM Standards, Part 13, "Refractories; Glass, Ceramic Materials; Manufactured Carbon and Graphite Products", published by the American Society for Testing Materials for definition of optical high index flint glasses and crown glasses which fall into the categories of high refractive index glasses and lower refractive index glasses. However, many different fiber optical materials are available on the market. Particularly, the various types of glass fiber optical elements manufactured by American Optical Corporation and designated types 50C, 70C, 70A, 73A, 47C and 47A which possess fiber core sizes on the order of about 5 to about 15 microns and having numerical apertures within the range of about 0.88 through about 1.0, respectively, have been found especially suitable. Also, as more fully developed in the examples hereinafter, Bendix Corporation type K-2 and D-14 fiber optical materials are especially suitable.

In our method of manufacturing gems, enhanced gemstones or doublet gemstones and other works of art displaying the optical effect of chatoyancy or multi-lined chatoyancy from fiber optical materials according to this invention, the proper orientation of the fiber optical material must first be obtained prior to cutting. Fiber optical material is normally manufactured and available in blocks or cylindrical sizes of various width, thickness and length (direction of light conductance) as desired. The chatoyant lines or bands of light will occur in our manufactured gems perpendicular to the direction of the light conduction through the fiber optical material. The direction of the light conduction through the fiber optical workpiece material may be determined by observing the transmission of light through the fiber optical block or cylinder as available from the manufacturer. Another simple test that we have used is to place a drop of water onto a surface of the fiber optical material and a light streak from a light source will be observed perpendicularly to the direction of the fibers. Once the fiber direction has been determined, our gems may be made by techniques of cutting, carving, polishing, etc. to achieve the desired effects. In the manufacture of a simulated cat's-eye cabochon of hemi-ellipsoidal solid shape, for example according to our technique, the light conducting direction of the fibers should be parallel to the minor axis and perpendicular to the major axis of the ellipsoidal to achieve the desired and preferred symmetry of single-line chatoyancy paralleling the major axis of the cabochoned fiber optic simulated gemstone.

A better understanding of the invention, its operating principles and parameters will be had by reference to the drawings in which.

Figure 1:
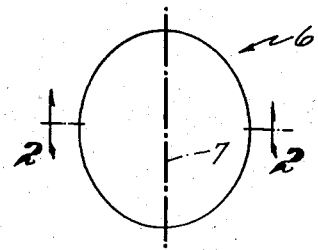
FIG. 1 is a plan view of a convex surfaced gem or cabochon cut on an exaggerated scale exhibiting the chatoyant effect of this invention.
Figure 2:
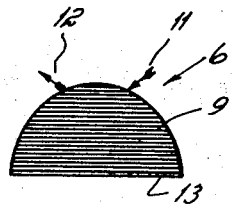
FIG. 2 is a central vertical view of the gem shown in FIG. 1 taken along line 2—2 with the microscopic parallel glass fiber cores or light guides illustrated by exaggeration.
Figure 3:
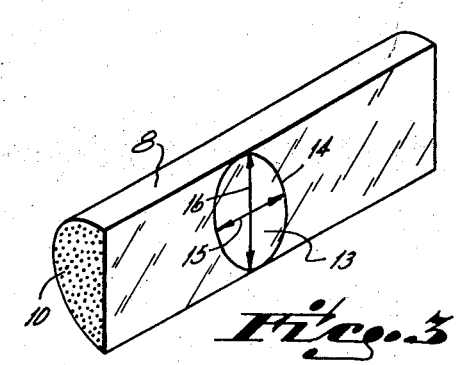
FIG. 3 is a length of fiber optical rod isometrically shown and indicating the bottom outline of the elliptical or cabochon gem of FIG. 1 which is cut from the rod.

With reference to the drawing, FIGS. 1–3, a synthetic cat's-eye gem 6 of our invention has the appearance of a most expensive natural cat's-eye mineral and, as shown in top plan enlarged view of FIG. 1, exhibits an optical chatoyant effect represented by dotted line 7. Such a cabochon-shaped gem 6 is formed by cutting and polishing an elliptically based, hemispherically shaped piece from the glass fiber optical rod 8 of FIG. 3. The gem 6 is a solid fused bundle of thousands of glass fibers, exaggeratingly represented at lines 9 and dots 10 (FIG. 3) represent the fiber ends. The fibers 9 extend perpendicularly to the rather sharp chatoyant beam of light 7 exhibited across the top i.e., optical display surface of the cabochon under exposure of gem 6 to external light. The microscopic fine, fused glass fibers 9 have cores which serve as light-guides or pipes to transmit light entering one light-receiving side of the hemispherically shaped gem 6 to the opposite light-displaying side as illustrated by arrows 11 and 12, respectively. Light which thus impinges on one side of the gem is reflected or transmitted through the light-guide fibers 9 to the opposite side and a pattern of light points exhibited by the multitude of fibers appear to the human eye as pure beams of light exhibiting a chatoyancy effect across the top of the gem 6. The chatoyant effect is thus produced by the reflection or transmission of light passing through the fibers 9 which have a higher refractive index core and a surrounding clad coating of a lower refractive index in the solid fused bundle form to make up gem 6. The glass-core and glass-clad fibers extend entirely and continuously through the gem 6 as shown in FIG. 2 and act as light pipes. Actually, as it is known in fiber optics, these bundles of fused glass fibers are made by drawing or extrusion techniques as the patents cited above describe and these descriptions are incorporated herein by reference. The fibers 9 are arranged in adjacent parallel side-by-side relation to each other and substantially parallel to the flat cabochon base 13. The flat base 13 is defined by the elliptical line 14 on the face of the semi-cylindrical rod 8 from which the gem of FIG. 1 is cut. The ellipse has a minor axis 15 which is coincident with the minor axis of the body of the gem 6 and major axis of the ellipse 14 is indicated at 16.

Thus, the gem 6 of FIG. 1 results from cutting, shaping and polishing the hemispherical body from rod 8 along outlines shown in FIGS. 1–3. This is done particularly by mounting the fiber optical rod 8 on a dop stick with dopping wax so that the direction of light conductance and fiber orientation will be the minor axis 15 of the cabochon when finished. Rough shaping of the dopped fiber optic rod 8 can be accomplished with a diamond lapping wheel with a grit size of 180 to 200 with water. The rough shape is then performed with 400 grit paper on a lapping wheel with water and then pre-polished with 600–800 grit on a lapping wheel with water. The simulated gemstone is then polished with fine cerium oxide grit and water on a lapping wheel and removed from the dopping stick. The resultant simulated gemstone displays a fine-lined chatoyancy which parallels the major axis 16 of the cabochon.

Figure 4:
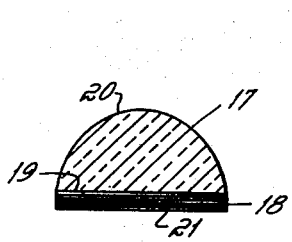
FIG. 4 is a cross-sectional enlarged view through a gemstone doublet construction according to the principles of this invention showing a cabochon cut of light-transmitting material mounted onto a plate of fiber optical material.

FIG. 4 illustrates the doublet embodiments of this invention, particularly useful for providing a normally non-chatoyant or non-asterismal synthetic or natural gem of light-transmitting material with the optical effects of chatoyancy or asterism. Such a gem of light-transmitting material 17 is shown in cross-section as mounted upon a glass fiber optical base plate 18. The material 17 is cut in cabochon form with a normally exposed optical display surface 20, either in round or oval contour, or in slight variations thereof, as the gem of FIG. 1 and the flat base portion 19 of the cabochon cut is mounted on the plate 18 of glass fiber optical material composed of the same material described above forming the fused glass fiber bundle of gem 6. The light-transmitting material 17 may either be of a natural or synthetic material including sapphire, ruby, amethyst, colored glass, plastic or any other similar transparent or translucent material and the color of same is immaterial. It has been found that such a material 17 cut in cabochon shape even though it normally does not have the capability of chatoyance, when mounted upon the glass fiber optical base plate 18 having fused glass fiber light guides represented at 21, a chatoyant effect is exhibited. The exact reasoning for the chatoyant effect is not understood. However, when the relatively thin base plate of fiber optical material is cut in a flat generally elliptical peripheral shape, as for example as exemplified by the outline of the gem 6 of FIG. 1, with the fibers in adjacent parallel relation and parallel to the base 19 of the material 17, the chatoyance in the otherwise normally non-chatoyant natural or synthetic stone is remarkedly observed. When the fibers of base plate 18, however, are perpendicular to base 19, chatoyancy is not observed in material 17. The beauty and perfection of the chatoyant effect has been found exceptional and fascinating. Similar effects can be provided to enhance the chatoyancy of natural gemstones.

The cutting and shaping of the gems from a fused bundle of fiber optical elements, rods, blocks, etc. can be accomplished with cabochon machines and other cutting machines known in the art of gem or semiprecious gemstone cutting in view of our invention and, by reason of the hardness, density and receptiveness to polishing of the glass fiber optical material, superiorly cut, shaped and polished artificial gems are achieved.

Figure 5A:
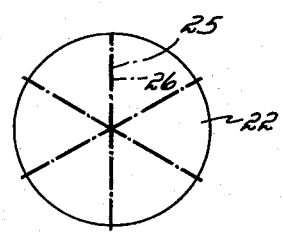
FIG. 5A is a plan view of a gem illustrating the asterism effect of one of the embodiments of this invention.
Figure 5B:
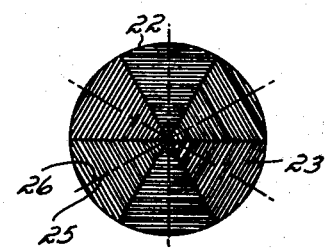
FIG. 5B is a horizontal cross-section through the gem of 5A showing an assembly of optical fiber elements to produce the asterismal effect of FIG. 5A, and FIGS. 6A–6E are cross-sections of various gem bodies, like FIG. 5A, showing fiber alignment in fine lines and multi-lined chatoyancy exhibited thereby in broken lines.
Figure 6A:
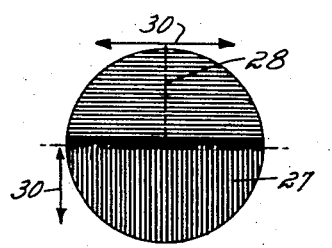
Figure 6B:
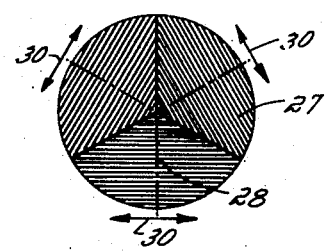
Figure 6C:
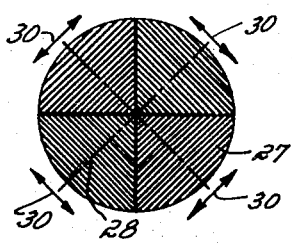
Figure 6D:
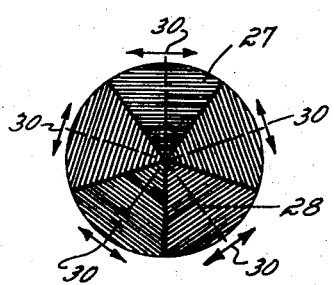
Figure 6E:
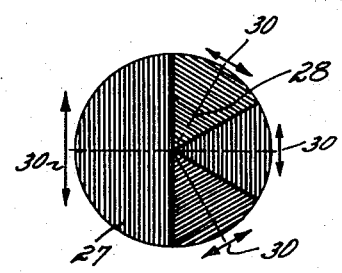

FIG. 5A of the drawing illustrates another form of this invention wherein the asterism effect 25 is exhibited by a cabochon shaped fiber optical material 22. FIG. 5B illustrates, in horizontal cross-section through the plan view of FIG. 5A, a composite arrangement of six fiber optical elements 22 with the fibers 23 running parallel to the base of the cabochon and perpendicular to its own light line 26 of the asterism effect 25. By way of example, an asterismal gem is prepared from a rod of fused bundle of fiber optical material by cutting six triangular prisms in such a manner that the light guides or fibers are substantially parallel to one side of the prism and intersect the other two sides at a substantial angle. In this form, the fibers 23 also run substantially parallel to the top and bottom portions of the prism. These six prisms are then joined together in the form of a hexagonal prism by placing the six triangular prisms together so that their base sides, to which the fibers 23 run substantially parallel, form the six outer sides of the prism. The six triangular prisms are then fused or bonded together by heating, gluing or softening under pressure sufficient to hold them together and form a hexagonal prism. After the hexagonal form is made, the stone is hemispherically shaped in cabochon form in the same manner as expressed above to provide in horizontal cross-section the alignment of fibers 23 shown in in FIG. 5B. The resulting gem 22, after being shaped, cut and polished, displays a six-pointed star under suitable light. The star rays 26 indicated in the plan view of FIG. 5A are at 90° angles relative to the respective sets of fibers 23 shown in the cross-section of 5B to give the visual representation of a six-pointed star.

FIGS. 6A–6E show in cross-section various gem bodies, made like the gem of FIGS. 5A–5B, except the fibers 27 are aligned in various directions to display the chatoyant light lines 28 on the surfaces of semispherically shaped bodies, like the gem body of FIG. 5B. As it can be appreciated from FIGS. 6A–6E, a variety of optical displays can be achieved and in each case, the multiple streaks of light 28 on the surfaces of the gems are perpendicular to the fiber orientation as shown by arrows 30. It is to be pointed out that plates 18 (FIG. 4) can be made having cross-sections as appearing in FIGS. 5B, 6A–6E, and gem doublets made in accordance with our description of FIG. 4 above will display the fascinating chatoyancy exhibited by these figures.

While the cabochon cuts have been illustrated in the drawings in both the single and doublet gem construction of this invention, it will be appreciated that there are other different works of art forms as mentioned above, either rectangular, irregular solids or otherwise to produce unusual optical effects either in planar faceted, curved or plane-curved gem bodies following the principles of this invention. However, as mentioned, the chatoyant or asterismal effect achieved in the artificial cabochon gems of this invention formed by the just-described techniques are unique, particularly beautiful and prized.

Specific examples of gems made in accord with the above description include.

EXAMPLE 1.

A cabochon gem of fiber optical material sold by Bendix Corporation under the designation K-2 was made according to FIGS. 1–3 above. This fiber optical material is a fused bundle of glass fibers of borosilicate glass-clad on lead glass-core having a core refractive index of 1.62 and a clad refractive index of 1.48. The core fiber diameter or cross-section is approximately 6 microns in thickness and the clad thickness is about 20 percent of the micron cross-sectional area of the core. The density of the solid fiber optical material is about 3.25 and it has a hardness of about 6.5. The cabochon had an elliptical base of about 1.1 cms. major axis and 0.9 cm. minor axis with a cabochon central height of about 0.5 cm. The gem exhibited a fine chatoyancy of light on a green-gray background similar to a fine naturally occurring chrome dioxide.

EXAMPLE 2.

A cabochon gem of fiber optical material sold by Bendix Corporation under the designation D-14 was made according to FIGS. 1–3 above. This fiber optical material is a fused bundle of glass fibers or borosilicate glass-clad on lanthanum borate glass-core having a core refractive index of 1.87 and a clad refractive index of 1.48. The core fiber diameter or cross-section is approximately 5.7 microns and the clad is about 20 percent of the micron cross-sectional area of the core. The density of the solid fiber optical material is about 3.93 and it has a hardness of about 6.5. The cabochon had an elliptical base of 1.3 cms. major axis and 1 cm. minor axis with a cabochon central height of about 0.3 cm. The gem exhibited a chatoyancy of light on greenish-yellow background.

EXAMPLE 3.

A cabochon doublet gem was made according to FIG. 4 above having a cabochon cut top gem of amethyst mineral and a plate of fiber optical material described in Example 2. The amethyst cabochon had an elliptical base of about 0.9 cm. major axis and 0.7 cm. minor axis with a cabochon central height of about 0.3 cm. The fiber optical plate of the same shape as the cabochon base was about 0.1 cm. in thickness. The amethyst gem exhibited a fine chatoyancy of white or pink light on a purplish tinted background.

EXAMPLES 4–11.

Following the procedures of Example 3 and FIG. 4, except with different cabochon natural or synthetic light-transmitting materials and gem dimensions, the following doublet gems were made according to the table which follows. The cabochon materials were normally non-chatoyant and except for the emerald, all materials were comprised of natural minerals. The chatoyant light streak(s) appearance was noted in the gem along the major gem axis as a light source moved along the minor axis of the gem on the top surface of the cabochon. The streak(s) appeared on the side of the gem surface opposite the light source and as the source passed over the top of the gem, the streaks were centered on the cabochon top.

TABLE

| Example | Cabochon Top | Major Axis (cm) | Minor Axis (cm) | Height (cm) | Optical Plate Thickness (cm) | Chatoyance Streak Appearance |
| --- | --- | --- | --- | --- | --- | --- |
| 4 | Cherry opal | 1.5 | 1.2 | 0.5 | 0.1 | Fine line on cherry background |
| 5 | Milky jelly opal | 1.5 | 1.0 | 0.2 | 0.1 | Broad flash on blue-green speckled background |
| 6 | Mexican jelly opal | 1.1 | 0.9 | 0.3 | 0.1 | Fine line on green-orange speckled background |
| 7 | Grand topaz | 1.0 | 0.7 | 0.4 | 0.1 | Fine lines on rust orange |
| 8 | Peridot | 0.9 | 0.8 | 0.3 | 0.1 | Fine lines on green background |
| 9 | Ruby garnet | 0.9 | 0.7 | 0.3 | 0.1 | Soft line on deep red background |
| 10 | Pink quartz | 0.9 | 0.7 | 0.4 | 0.1 | Fine lines on pink background |
| 11 | Emerald | 0.9 | 0.7 | 0.3 | 0.1 | Fine lines on green background |

EXAMPLE 12.

A multi-lined milky opal potch doublet was made by providing a milky opal gem with a flat rectangularly shaped base (1 × 1.5 cms) whose cental minor axis (1 cm) was semi-circular in cross-section and whose major axis (1.5 cms) cross-section had even arcuate sides terminating in a central flat top portion. The central height of the gem was about 0.4 cm. A flat base plate of fiber optical material as in Example 2 of rectangular shape to correspond to the flat base of the opal top gem was mounted on the base of the gem with the fibers of the plate extending perpendicularly to the major axis of the gem and parallel to the flat base. The gem displayed flashing beams of light across the top center of the gem and sides on a milky white background.

From the above description and examples, it will be understood that the present invention provides for new and improved gems or works of art, simulated gemstones and gemstone doublet constructions having the properties of exhibiting asterismal or chatoyancy effects when viewed under suitable lighting conditions. Furthermore, in employing the glass fiber optical materials of this invention, the gems display a hardness and density closely approximating natural minerals. Furthermore, they do not suffer from aging or deterioration effects normally associated with plastic imitation gems. Also, the artificial gems of this invention are scratch resistant and withstand the normal wear associated with jewelry and finer gems. Also, the gems or works of art may be re-cut or re-polished without loss of beauty. There are various changes that may be made in the form, construction and arrangement of the gems which will be understood and without departing from the spirit and scope of this invention or sacrificing any of its advantages. However, in view of the above description and examples, such modifications will become apparent to one of ordinary skill.

What is claimed is:

1. A doublet gemstone construction comprising a gem of light-transmitting material having an optical display surface and a base portion, said construction further comprising means for creating at least single-lined light display on said gem surface, said means including a fiber optical element mounted on said base portion, said element comprising a solid fused bundle of a multitude of fine, elongated visible light-conducting fibers having cores of high refractive light index surrounded with a clad layer of lower refractive light index, said fibers arranged to extend in parallel side-by-side relation to each other in a direction generally parallel to said base portion for conducting light and for said display of light on said gem surface.

2. The doublet gemstone construction of claim 1 wherein said gem has a cabochon shape that provides said display surface and said base portion and wherein said element is mounted on said base portion with said fibers generally parallel to the base portion to provide an optical effect of chatoyancy.

3. The doublet gemstone construction of claim 1 wherein said gem has a cabochon shape that provides said display surface and said base portion and wherein said means comprises a plurality of said elements, each element being mounted on said base portion with said fibers generally parallel to the cabochon base portion and arranged to provide an optical effect of asterism.

4. The doublet gemstone construction of claim 2 wherein said element is a thin plate secured to said base portion.

5. The doublet gemstone construction of claim 4 wherein said cores have diameters on the order of at least about 2 microns.

6. The doublet gemstone construction of claim 5 wherein said diameters are within the range of about 3 to about 80 microns.

* * * * *